July 26, 1960 O. G. FERM 2,946,560
TOOL FOR GUIDING WIRES INTO CONDUITS
Filed May 19, 1958 2 Sheets-Sheet 1
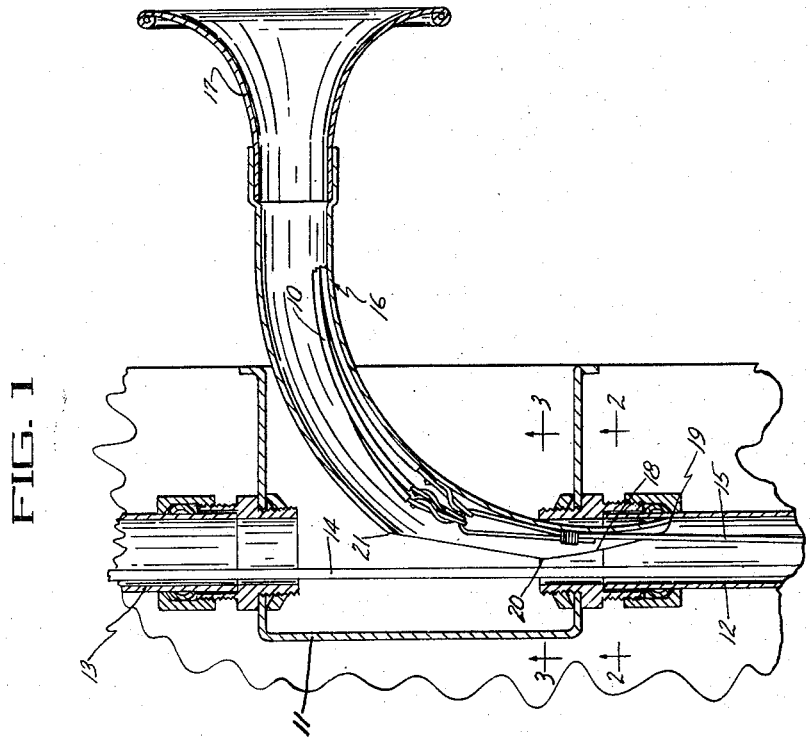
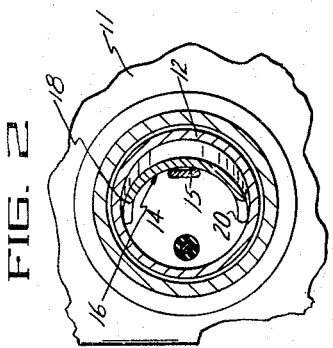
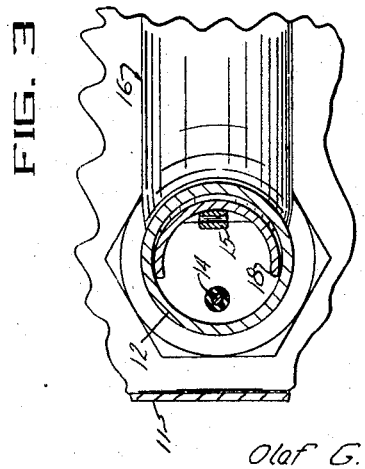
INVENTOR.
Olaf G. Ferm
BY July 26, 1960  O. G. FERM  2,946,560
TOOL FOR GUIDING WIRES INTO CONDUITS
Filed May 19, 1958  2 Sheets-Sheet 2

INVENTOR.
Olaf G. Ferm
BY
atty.

United States Patent Office 2,946,560
Patented July 26, 1960

2,946,560

TOOL FOR GUIDING WIRES INTO CONDUITS

Olaf G. Ferm, 2708 W. Boone, Spokane, Wash.

Filed May 19, 1958, Ser. No. 736,163

6 Claims. (Cl. 254—134.3)

My invention relates to improvements in a tool for guiding wires into conduits. In installing wires in conduits where the conduits terminate at so called outlet and junction boxes, the problem is to guide wires into the box as they are being pulled through. In many cases the problem is complicated further by the fact that there may be other wires already in the conduit and going through the box. In my application, Serial No. 607,149, filed August 30, 1956, there is shown a feeding tube for guiding wires into a conduit through a box. However, with that feeding tube there was no provision for inserting the tube in a conduit where wires were already present. My present invention is an improvement over the feeding tube of my prior invention whereby the tube for guiding wires into the conduit may be used in conduits having wires already in them and extending from them across the box. The present invention also embodies other features whereby the guide tube can be made larger in interior diameter and yet held securely within the box.

The nature and advantages of my invention will appear more fully from the following description and the accompanying drawings illustrating the invention in its preferred form. The drawings and description, however, are illustrative only and are not intended to limit the invention except insofar as it is limited by the claims.

In the drawings:

Figure 1 is a sectional view taken through a junction box showing my invention as it is used in pulling wires;

Figure 2 is an enlarged sectional view taken on the line 2—2 of Figure 1;

Figure 3 is an enlarged sectional view taken on the line 3—3 of Figure 1;

Figure 4:
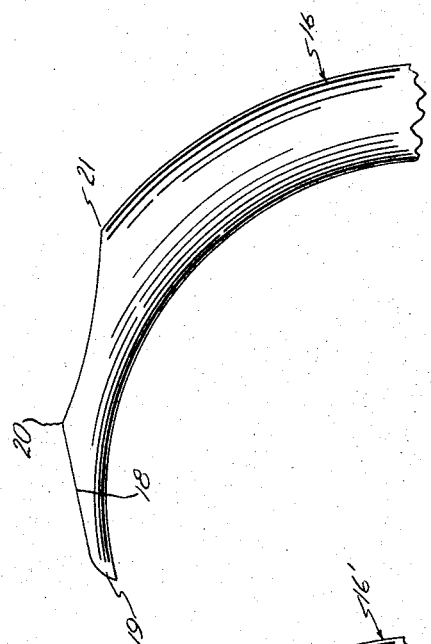
Figure 4 is a view in side elevation of the tool for guiding wires into conduits.

Referring now to the drawings and particularly to Figure 1 of the drawings, my invention is shown in use for guiding insulated wires 10 through a box 11 into a conduit 12. The box 11 has a second conduit 13 connected thereto and a wire 14 is already located in the conduits 12 and 13 and extends across the box 11. A pull tape 15 is used to pull the wires 10.

The guide tool is a tube 16 of ample interior diameter to receive the wires 10 that have to be pulled into the conduit 12. The tube 16 has a flared funnel 17 mounted therein to guide the wires 10 into the tube 16 from a coil on the floor or on a wire holding tray such as that illustrated in my prior application. The function of the tube 16 is to provide a smooth channel to guide the wires 10 through the box 11 into the conduit 12 so that the wires will not catch on the conduit or box and will have an opportunity to align with each other and move into the conduit free of any kinks and free of cuts or abrasions of their insulation. The tube 16 must remain in place once it is inserted in the conduit and withstand the normal disturbances that are incident to pulling the wires without falling out.

According to my invention I make the tube 16 with an elongated open tip portion 18 near the end 19 which is less than half the tube diameter. This tip portion will enter the conduit 12 even though its exterior diameter is slightly greater than the interior diameter of the conduit 12. The portion 18 is increased in size from the tip 19 to a portion 20 which is more than half the tube diameter. This portion 20 provides frictional holding engagement between the conduit 12 and the tube 16. The parts of the portion 20 that extend past the center of the conduit 12 have to yield inward and wedge against the conduit to provide a yielding means to hold the tube in the conduit. It is to be noted that the portion 20 of the tube 16 does allow the tube to be inserted in the conduit 12 with other wires such as 14 already in the conduit 12. This is an important advantage. The tube 16 is open on the outside of the curve to the point 21. The point 21 is beyond the point where a straight line along the conduit axis would intersect the outer wall of the tube 16 so the tube 16 can be inserted through a box where wires already are present, into the conduits that carry wires from the box. It will be noted from the drawings that the tube 16 is curved throughout its length so as to direct one end at substantially right angles to the other. Actually, as shown, the tip portion 18 is curved so that when the tip portion is inserted within a conduit, the part thereof on the inside of the curve strikes the conduit at only two places, one at the entrance to the conduit and the other the extreme end 19 of the portion 18 well within the conduit.

Figure 5:
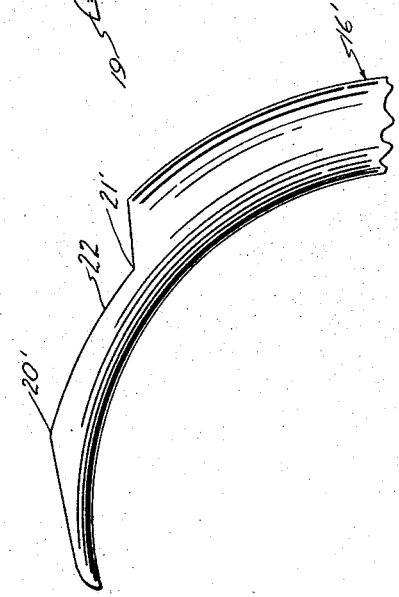
Figure 5 is a view like Figure 4 of a modified form of the invention.

The particular design of the cut open part of the tube from the portion 20 to the point 21 may be varied. Figure 5 shows a variation wherein the edge 22 follows the curvature of the tube 16' from the point 21' to the portion 20'. The tube 16' is cut abruptly to the middle at 21' from the outside of the curve of the tube. This modification operates in the same manner as the main form of the invention.

Figure 6:
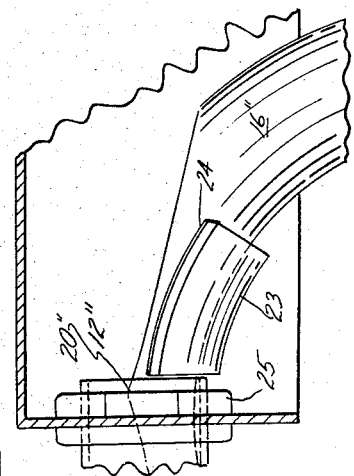
Figure 6 is a fragmentary sectional view showing a further modification of the invention.

The tube 16 may have additional means applied to it to hold it in the conduit 12. One means which does not obstruct the entry of wires into the conduit either through the tube or from the box below the tube is illustrated in Figure 6 of the drawings. This means utilizes magnetic attraction. Preferably the magnetic attraction is obtained by a permanent magnet 23 which is provided on the portion 20" of the tube 16" in Figure 6. The magnet 23 exerts a pull on the tube 16" by reason of its attraction to the conduit 12", whenever the portion 20" is inserted to the proper place in the conduit 12", which pull tends to force the tube 16" further into the conduit 12". Magnetizing the entire tube 16 would also tend to hold the tube in place but would be more difficult to handle because of the tendency of the tube to attract any magnetic material. The small magnet on the inside of the curve of the tube is not so apt to contact other metal objects. The magnet 23 can be secured in any manner to the tube 16" as by cement shown at 24. The conduit 12" and its clamp nut 25 are usually made of steel and will be attracted to the magnet 23.

My improved tool for guiding wires into conduit provides a simple one piece unit that can be used wherever the need for guiding wires into a conduit exists. The tube 16 is big enough in cross section to take as many wires as can be drawn into the conduit. The cut-away tip portion 18 and the yielding wedging portion 20 make it easy to insert the tool in a conduit through the various junction and outlet boxes. Being open on the convex side of the curve beyond the portions 18 and 20 into the box, the tool can be placed over wires already in the conduit without injuring such wires. The tube has a sufficiently long curved tubular portion to get the kinks and bends out of the wires being pulled through it. The inside of the curve of the tube provides a rounded channel into the conduit to protect the wire insulation. The portions 20, if they become worn, can be spread slightly to make them hold properly in the conduit. Preferably the tubes 16 are made up for each standard size of conduit. The size of the tube 16 should be ample to receive the wires. Preferably it is about the same diameter as the conduit 12 with which it is to be used. It can be slightly smaller.

It is believed that the nature and advantages of my invention will be apparent from the foregoing description.

Having described my invention, I claim:

1. A guide for guiding wires as they are pulled into a conduit through a connection box comprising a curved tube having part of the material cut away along the outside of the curve from one end thereof to provide an open channel comprising a tip portion at said end insertible into the conduit, gripping means on said tube spaced from the tip portion, insertible in the conduit with said tip portion for yieldably engaging the inner surface of the conduit at a distance from said tip portion whereby to hold the tip portion in the conduit, the open channel extending beyond said gripping means along the tube to admit wires extending from the conduit across the box, and the tube being closed from the open channel to its other end to provide a closed channel for confining new wires that are being fed into the conduit.

2. A guide for guiding wires as they are pulled into a conduit through a connection box comprising a curved tube having part of the material cut away along the outside of the curve from one end thereof to provide an open channel comprising a tip portion at said end insertible into the conduit, and a gripping portion positioned to engage the inner surface of the conduit, said gripping portion being spaced away from said end, the open channel extending beyond the gripping portion along the tube to clear wires already in the box extending into the conduit, and the tube being closed from the open channel to its other end to provide a closed channel for confining new wires that are being fed into the conduit.

3. A guide for guiding wires as they are pulled into a conduit through a connection box comprising a curved tube having part of the material cut away along the outside of the curve from one end thereof to provide an open channel comprising a tip portion at said end insertible into the conduit, and a gripping portion positioned to engage the inner surface of the conduit, said gripping portion being spaced away from said end, the open channel extending beyond the gripping portion along the tube to clear wires already in the box extending into the conduit, the tube having means on the exterior thereof engageable with the conduit and cooperating with said gripping portion to hold the tip portion in the conduit, and the tube being closed from the open channel to its other end to provide a closed channel for confining new wires that are being fed into the conduit.

4. A guide for guiding wires as they are pulled into a conduit through a connection box comprising a curved tube having part of the material cut away along the outside of the curve from one end thereof to provide an open channel comprising a tip portion at said end insertible into the conduit, and a gripping portion having opposed sides positioned to engage the inner surface of the conduit at two diametrically opposite places, said gripping portion being spaced away from said end, the open channel extending beyond the gripping portion along the tube to clear wires already in the box extending into the conduit, and the tube being closed from the open channel to its other end to provide a closed channel for confining new wires that are being fed into the conduit.

5. A guide for guiding wires as they are pulled into a conduit through a connection box comprising a curved tube having part of the material cut away along the outside of the curve from one end thereof to provide an open channel comprising a tip portion at said end insertible into the conduit, gripping means on said tube spaced from the tip portion, insertible in the conduit with said tip portion for yieldably engaging the inner surface of the conduit at a distance from said tip portion whereby to hold the tip portion in the conduit, the open channel extending beyond said gripping means along the tube to admit wires extending from the conduit across the box, the tube having magnetic means thereon operable to attract the tube to a conduit in which it is inserted.

6. A guide for guiding wires as they are pulled into a conduit through a connection box comprising a curved tube having part of the material cut away along the outside of the curve from one end thereof to provide an open channel comprising a tip portion at said end insertible into the conduit, a gripping portion positioned to engage the inner surface of the conduit, said gripping portion being spaced away from said end, the open channel extending beyond the gripping portion along the tube to clear wires already in the box extending into the conduit, and a permanent magnet mounted on the exterior surface of said channel adjacent to said gripping portion.

References Cited in the file of this patent

UNITED STATES PATENTS

| | | |
|---|---|---|
| 2,258,745 | Dewey et al. | Oct. 14, 1941 |
| 2,515,724 | McCroskey | July 18, 1950 |
| 2,838,280 | Eyles | June 10, 1958 |

OTHER REFERENCES

"Murray Underground Accessories," published by the Murray Conduit Systems, New York, 1926.